P. J. MARKS.
PHOTOGRAPHIC SHUTTER.
APPLICATION FILED FEB. 14, 1918.
1,270,311.
Patented June 25, 1918.
2 SHEETS—SHEET 1.
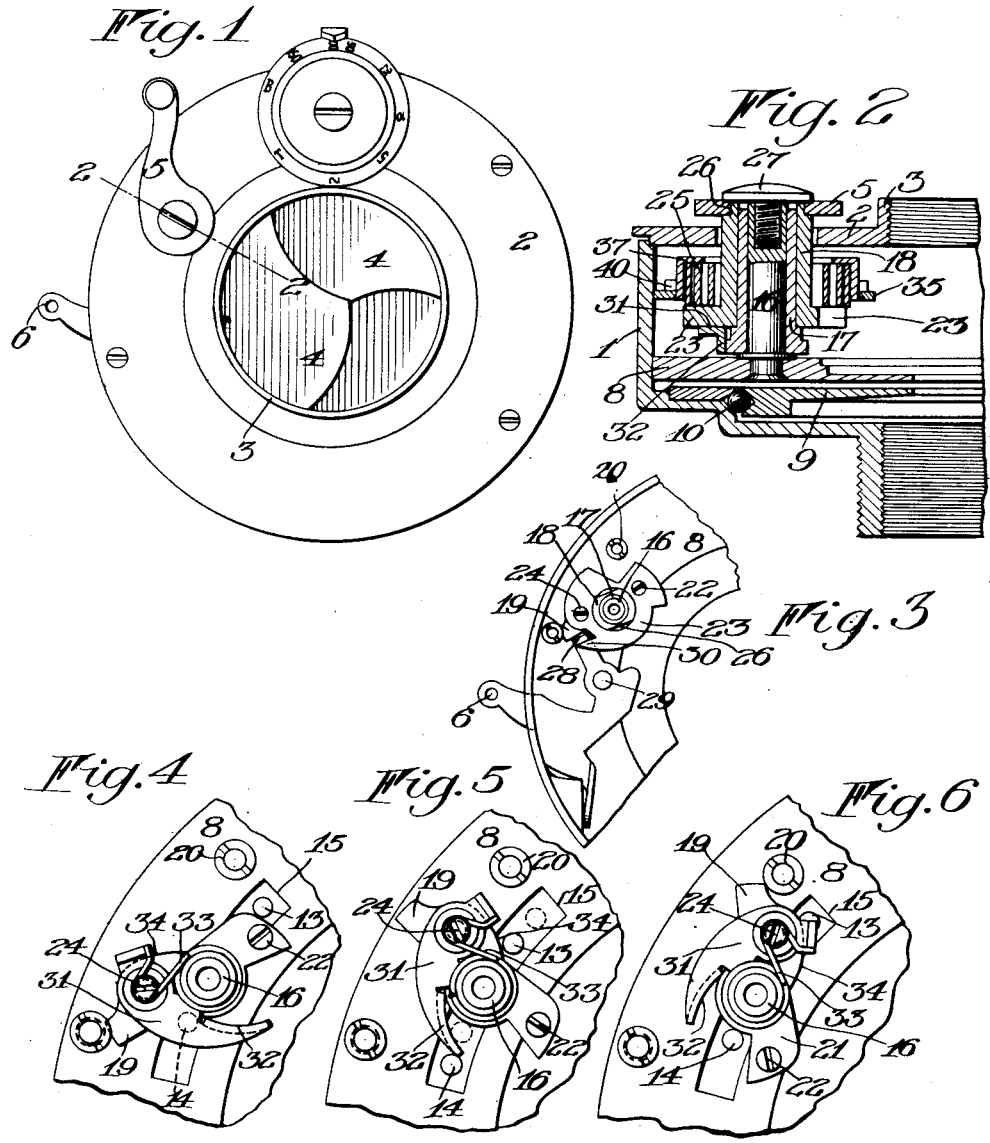
WITNESSES
George D Powell
Agnes Nisbett Bissell
INVENTOR.
Paul J. Marks
BY Church & Church
his ATTORNEYS.

P. J. MARKS.
PHOTOGRAPHIC SHUTTER.
APPLICATION FILED FEB. 14, 1918.
1,270,311.
Patented June 25, 1918.
2 SHEETS—SHEET 2.
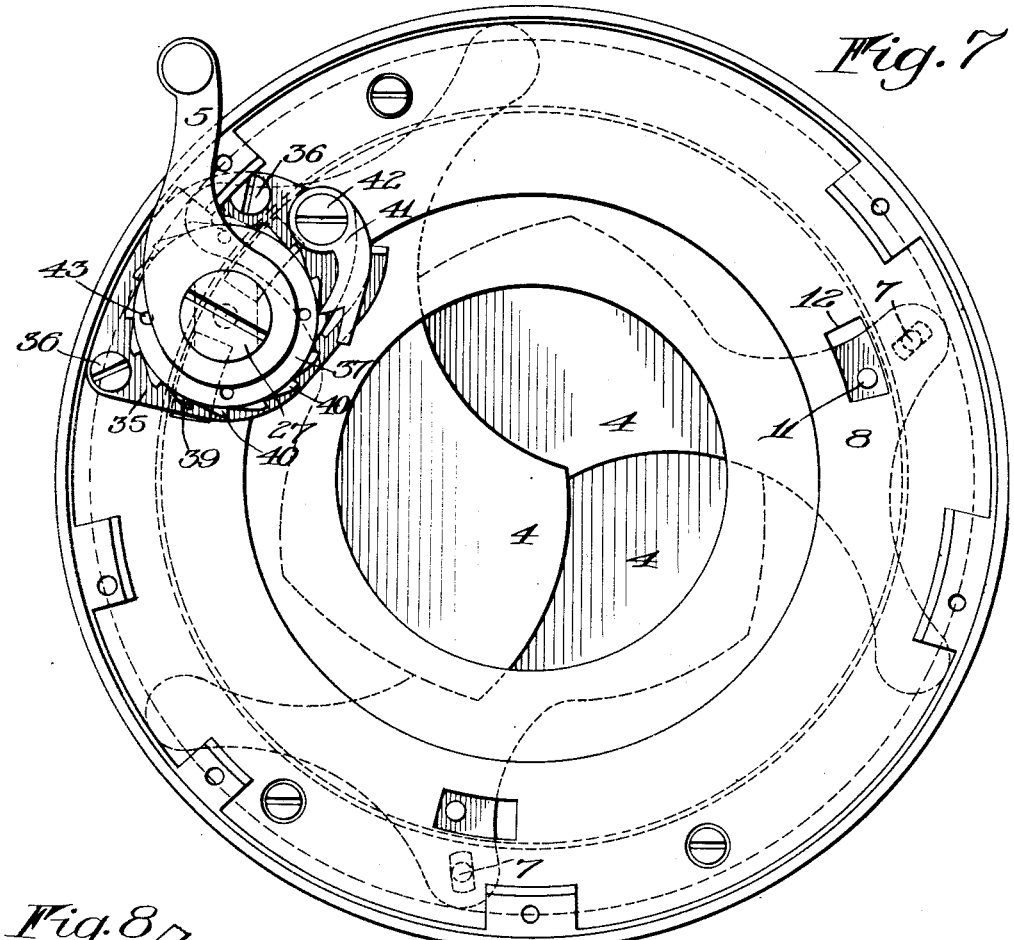
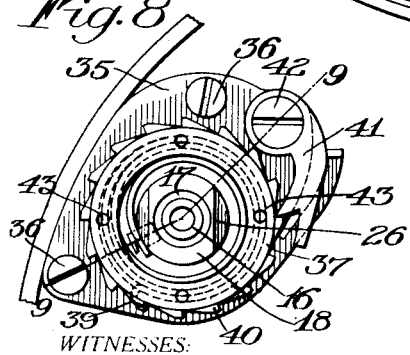
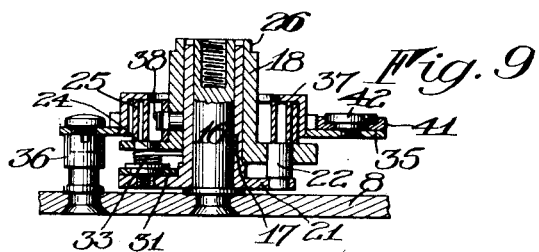
WITNESSES:
George W Powell
Agnes Nesbitt Bissell
INVENTOR.
Paul J. Marks
BY
his ATTORNEYS.

UNITED STATES PATENT OFFICE.

PAUL J. MARKS, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SHUTTER.

1,270,311.  Specification of Letters Patent.  Patented June 25, 1918.

Application filed February 14, 1918. Serial No. 217,288.

*To all whom it may concern:*

Be it known that I, PAUL J. MARKS, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

My present invention relates to photography and more particularly to camera shutters of the pivoted blade type in which the shutter is set by tensioning a spring driven master member and it has for its object to provide a simple, efficient and convenient means for varying the tension of the spring to correct the timing of the shutter. To these and other ends the invention resides in certain improvements and combinations of parts all as will be hereinafter more fully described, the novel features being pointed out in the claims at the end of the specification.

In the drawings:

Figure 1 is a front elevation of a photographic shutter constructed in accordance with and illustrating one embodiment of my invention;

Fig. 2 is an enlarged detail section through the master member and adjacent parts taken substantially on the line 2—2 of Fig. 1;

Fig. 3 is a fragmentary view of the operating mechanism;

Figs. 4, 5 and 6 are enlarged fragmentary views of the blade actuating mechanism showing the parts in various positions;

Fig. 7 is an enlarged view of the shutter with the cover plate removed and also all of the shutter mechanism not pertinent to this invention;

Fig. 8 is an enlarged fragmentary view of the master member and adjacent parts, and Fig. 9 is a section on the line 9—9 of Fig. 8.

Similar reference numerals throughout the several views indicate the same parts.

My improvements are applicable to the shutter shown complete in my prior Patent No. 1,239,025, of September 4, 1917, to which reference is here made for a detail explanation of the entire mechanism but I have shown herein only such parts as are required for an understanding of the present invention and the parts repeated in the present drawings will be but briefly described.

Referring first to Figs. 1, 2 and 7, 1 indicates an annular shutter casing having a cover plate 2, lens opening 3 and blades 4 controlling the latter. The shutter is wound or set by a setting lever 5 and released to cause the opening and closing of the blades by an operating member 6. The blades 4 are pivoted at 7 to the casing beneath a partition member 8 which separates the blades from the shutter controlling and operating mechanism much of which is mounted upon the partition member but is not shown herein. Also arranged beneath the partition member 8 is a rotary blade actuating ring 9 having a suitable bearing 10 in the casing and provided with pins 11 that extend through bearings in the blades 4 and operate in slots 12 in the partition member 8. Hence, as the ring is moved in one direction, the blades open and when moved in the other direction, they close. The ring, in turn, is actuated by the master or driving member through the medium of two additional pins 13 and 14 on the ring operating through a slot 15 in the partition 8 and I will now proceed to describe the master member.

Fixed to the partition member 8 between the pins 13 and 14 is an upstanding pivot 16. The master member turns on this pivot and is made, in the present instance, in two parts; an inner hub 17 and an outer hub 18 inclosing it. A lateral projection or flange 19 at the base of the inner hub is adapted to engage a fixed pin 20 on the partition 8 to limit the movement of the master member to the right (Fig. 6) while another similar extension or flange 21 carries fixed thereto a pin 22 that takes into an opening in a disk 23 at the base of the outer hub 18 and serves to lock the two hubs or parts of the master member together for joint movement. They are further locked in a similar manner by a pivot screw 24 on the flange 19 hereinafter referred to. The master member is driven to the right until stopped in the normal position of Fig. 6 by a spring 25 and to wind or set the master member and place this spring under tension, the setting lever 5 is provided. This setting lever (Fig.

2) is locked to a squared portion 26 of the outer hub 18 by a cap screw 27 threaded into the latter. When the lever is moved to the left to tension the spring, the master member is held by a detent 28 pivoted at 29 and engaging a shoulder 30 on a portion of the disk 23 of the outer hub 18, as shown in Fig. 3. This detent is an extension of the operating lever 6 so that depressing the latter releases the master member and it flies back to the position of Fig. 6.

While the master member is being set, its parts move from the position of Fig. 6 to that of Fig. 4. A pawl 31 mounted on the pivot screw 24 before referred to, is provided with a downwardly projecting curved flange 32 and during this movement, this flange rides against the outside of blade operating pin 14 and snaps in behind it under the influence of a spring 33 acting on the pawl. This does not affect the blades as they are closed when the pins 13 and 14 are in the positions of Figs. 4 and 6. When the shutter is operated and the detent 28 released, however, so that the master member rotates to the right, the flange 32 on the pawl displaces the pin 14 turning the blade ring 9 to the left and opening the blades. Immediately this opening is effected, a cam surface 34 on the projection 19 of the inner hub 17 engages the pin 13 and moves it from the full line to the dotted line position of Fig. 5, closing the blades again and thereafter the normal position of Fig. 6 is again reached.

In the practice of my present invention, I provide a fixed table or shelf 35 supported in spaced relation to the partition member 8 by posts 36 and the pivot 16 and the hubs 17 and 18 extend through and above this table. Rotatable in a bearing in this table is a spring casing or turret 37 surrounding the hubs of the master member and inclosing the driving spring 25. The said spring is preferably a ribbon spring wound in a flat spiral coil and the inner end is connected by a pin 38 to the outer hub 18 while the outer end is connected at 39 to the casing 37 by being hooked through an aperture therein. On the periphery of the casing 37 is a series of ratchet teeth 40 engaged by a spring pawl 41 pivoted at 42 to the table 35. When it is desired to increase the tension of the spring 25, the casing 37 is rotated to the right in the figures by means of a spanner inserted in sockets 43 therein and to reduce its tension, the pawl 41 is disengaged and the spring allowed to unwind to the desired extent under the control of the spanner.

With the tension of the master spring placed under control in this convenient manner, the driving force exerted upon the shutter mechanism can be controlled and hence its maximum and minimum speeds. It is of particular utility in setting up the shutter in the first instance as the retarding devices through which the automatically timed exposures are regulated, are not all exactly uniform as manufactured and through the practice of my invention, the main or driving spring can be so adjusted in each case that all retarding and actuating devices moving under its influence can be made to behave exactly the same in each case.

I claim as my invention:

1. In a shutter, the combination with a casing, shutter blades, and a blade ring for actuating the latter, of a pivot fixed to the casing, a master member rotatable thereon and coöperating with the blade ring, a rotatable spring casing surrounding the pivot and carried by the shutter casing, a coil spring within the spring casing having one end connected thereto and the other end connected to the master member and means for adjustably securing the spring casing in different positions to vary the tension of the spring.

2. In a shutter, the combination with a casing, shutter blades, and means for actuating the latter, of a fixed table within the casing, a pivot fixed to the casing to extend through the table, a master member rotatable on the pivot and coöperating with the blade ring, a rotatable spring casing surrounding the pivot and having a bearing in the table, said spring casing being provided with ratchet teeth, a flat spiral spring within the spring casing having one end connected thereto and the other end connected to the master member, and a pawl on the table coöperating with the ratchet teeth to hold the spring casing in different positions of rotary adjustment.

PAUL J. MARKS.

Witnesses:
HELEN M. FRASER,
MARGARET DUIGNON.